(12) United States Patent
Kirshenbaum et al.

(10) Patent No.: US 8,311,957 B2
(45) Date of Patent: Nov. 13, 2012

(54) METHOD AND SYSTEM FOR DEVELOPING A CLASSIFICATION TOOL

(75) Inventors: Evan R. Kirshenbaum, Mountain View, CA (US); George Forman, Port Orchard, WA (US); Shyam Sundar Rajaram, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 469 days.

(21) Appl. No.: 12/618,181

(22) Filed: Nov. 13, 2009

(65) Prior Publication Data

US 2011/0119209 A1    May 19, 2011

(51) Int. Cl.
  *G06F 15/18*    (2006.01)
  *G06F 17/00*    (2006.01)
(52) U.S. Cl. ............................................ 706/12; 706/45
(58) Field of Classification Search ........................ None
  See application file for complete search history.

(56) References Cited

U.S. PATENT DOCUMENTS

| | | |
|---|---|---|
| 6,763,338 B2 | 7/2004 | Kirshenbaum |
| 6,823,323 B2 | 11/2004 | Forman |
| 6,839,680 B1 | 1/2005 | Liu et al. |
| 7,240,039 B2 | 7/2007 | Kirshenbaum |
| 7,406,452 B2 | 7/2008 | Forman |
| 7,415,445 B2 | 8/2008 | Forman |
| 7,437,334 B2 | 10/2008 | Forman |
| 7,437,338 B1 | 10/2008 | Forman |
| 7,502,767 B1 | 3/2009 | Forman |
| 7,558,766 B1 | 7/2009 | Forman |
| 7,593,903 B2 | 9/2009 | Forman |
| 7,668,789 B1 | 2/2010 | Forman |
| 7,720,781 B2 | 5/2010 | Forman |
| 2003/0101449 A1 | 5/2003 | Bentolila et al. |
| 2005/0130109 A1 | 6/2005 | Kirshenbaum |
| 2008/0126176 A1 | 5/2008 | Iguchi |
| 2010/0114654 A1 | 5/2010 | Lukose |

OTHER PUBLICATIONS

Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: "The Collective Intelligence Platform," Online, http://www.baynote.com/technology/platform/ 2010.
Hottolink Inc.; "Recognize" Online, http://www.hottolink.co.jp/english/reconize.html, 2009.
Andrejko et al.: "User Characteristics Acquisition from Logs with Semantics" 8. Slovak University of Technology in Bratislava.

(Continued)

*Primary Examiner* — Alan Chen

(57) ABSTRACT

An exemplary embodiment of the present invention provides a computer implemented method of developing a classifier. The method includes obtaining a set of training data comprising labeled cases. The method also includes training a classifier based, at least in part, on the training data. The method also includes applying the classifier to a plurality of unlabeled cases to generate classification scores for each of the unlabeled cases, wherein each classification score corresponds with an instance of a corresponding case. Furthermore, the classification score corresponding to a first instance in a case is computed based, at least in part, on a value of a case-centric feature corresponding to the first instance, wherein the value of the case-centric feature is based, at least in part, on characteristics of the first instance and a second instance in the case.

20 Claims, 4 Drawing Sheets

OTHER PUBLICATIONS

Hongjun Lu et al: Extending a Web Browser with Client-Side Mining, Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda An Accurate and Scalable Web based Recommendation System?" University of Southern California, Los Angeles, Sep. 2001.

Why Wubat? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking", 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

Google Trends, "About Google Trends," available at http://www.google.com/intl/en/trends/about.html (last accessed on May 27, 2010).

IBM Webfountain, "Fountain of truth?", available at http://www.economist.com/science/tq/displayStory.cfm?story_id=2019861 (last accessed on May 27, 2010).

Quint, Barbara, "IBM's WebFountain Launched—The Next Big Thing?", available at http://newsbreaks.infotoday.com/nbreader.asp?ArticlesID=16617 (last accessed on May 27, 2010).

Seung, H.S., et al., "Query by Committee," Colt '92: Proceeding of the Fifth Annual Workshop on Computational Learning Theory, New York, New York, 1992, pp. 287-294.

Lewis, David D., et al., "Heterogeneous Uncertainty Sampling for Supervised Learning," Proceedings of the Eleventh International Conference on Machine Learning, Morgan Kaufmann Publishers, San Francisco, California, 1994, pp. 148-156.

Tong, Simon, et al., "Support Vector Machine Active Learning with Applications to Text Classification," Journal of Machine Learning Research, 2001, pp. 45-46.

Zhang, Cha, et al., "An Active Learning Framework for Content Based Information Retrieval," IEEE Transactions on Multimedia, Special Issue on Multimedia Database, vol. 4, Issue 2, Jun. 2002, pp. 260-268, available at http://research.microsoft.com/en-us/um/people/chazhang/publications/tr01_04_chazhang.pdf (last accessed on Jun. 3, 2010).

Melville, Prem, et al., "Diverse Ensembles for Active Learning," Proceedings of the 21st International Conference on Machine Learning, Banff, Alberta, Canada, Jul. 2004, pp. 584-591.

Yan, Rong, et al., "Automatically Labeling Video Data Using Multiclass Active Learning," Proceedings of the Ninth IEEE International Conference on Computer Vision, Washington, D.C., vol. 2, 2003, pp. 1-8.

Hakkani-Tur, Dilek, et al. "An Active Approach to Spoken Language Processing," ACM Transactions on Speech and Language Processing, vol. 3, No. 3, Oct. 2006, pp. 1-31.

Ertekin, Seyda, et al., "Active Learning for Class Imbalance Problem," Proceedings of the 30th Annual International ACM SIGIR Conference on Research and Development in Information Retrieval, Amsterdam, The Netherlands, 2007, pp. 823-824.

Collins, Brendan, et al., "Towards Scalable Dataset Construction: An Active Learning Approach," Proceedings of the 10th European Conference on Computer Vision, Part I, Marseille, France, Published in 2008 by Springer-Verlag, Berlin, Heidelberg, pp. 86-98.

Forman, George, "BNS Feature Scaling: An Improved Representation over TF-IDF for SVM Text Classification," Proceedings of the 17th ACM Conference on Information and Knowledge Management in Napa Valley, California, Published by ACM, New York, New York, 2008, pp. 263-270.

Settles, Burr, et al., "Multiple-Instance Active Learning," Advances in Neural Information Processing Systems (NIPS), MIT Press, 2008, pp. 1289-1296.

Vijayanarasimhan, Sudheendra, et al., "What's It Going to Cost You?: Predicting Effort vs. Informativeness for Multi-Label Image Annotations," IEEE Computer Society Conference on Computer Vision and Pattern Recognition (CVPR), Miami Beach, Florida, Jun. 2009, available at http://userweb.cs.utexas.edu/~svnaras/papers/vijayanarasimhan_grauman_cvpr2009.pdf. (last accessed on Jun. 3, 2010).

Forman, George, et al., "Feature Shaping for Linear SVM Classifiers," Published and presented at the 15th ACM SIGKDD Conference on Knowledge Discovery and Data Mining, Paris, France, Jun. 28-Jul. 1, 2009, pp. 299-307.

METHOD AND SYSTEM FOR DEVELOPING A CLASSIFICATION TOOL

BACKGROUND

Marketing on the World Wide Web (the Web) is a significant business. Users often purchase products through a company's Website. Further, advertising revenue can be generated in the form of payments to the host or owner of a Website when users click on advertisements that appear on the Website. The online activity of millions of Website users generates an enormous database of potentially useful information regarding the desires of customers and trends in Internet usage. Understanding the desires and trends of online users may allow a business to better position itself within the online marketplace.

However, processing such a large pool of data to extract the useful information presents many challenges. For example, the different online entities that generate electronic documents may use different techniques or codes to represent similar information. Techniques for identifying the significance of certain information may not be readily available.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
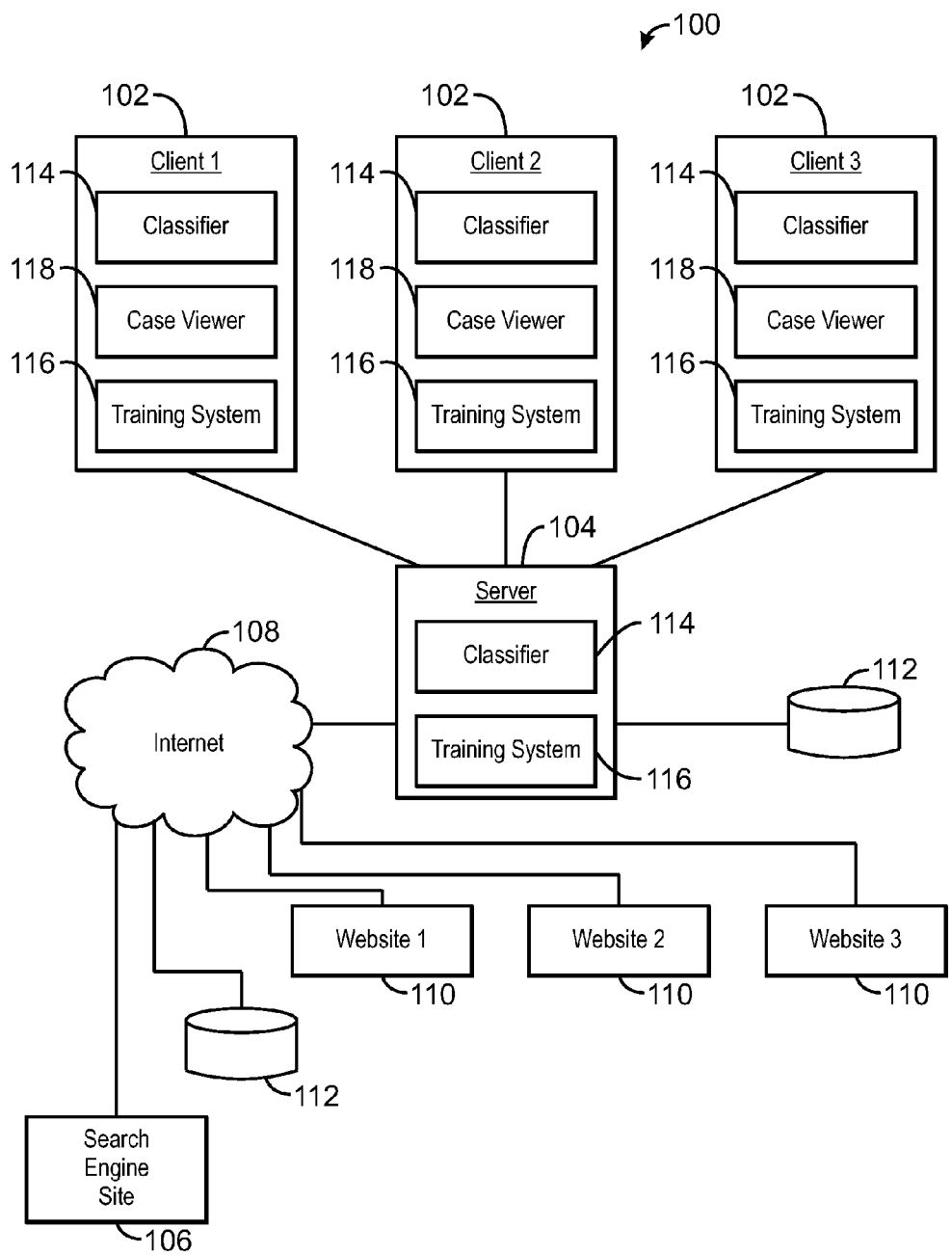
FIG. 1 is a block diagram of a computer network that may be used to develop a classification tool, in accordance with exemplary embodiments of the present invention.

Exemplary embodiments of the present invention provide techniques for identifying semantically-similar portions of structured data lacking a common ontology. As used herein, the term "exemplary" merely denotes an example that may be useful for clarification of the present invention. The examples are not intended to limit the scope, as other techniques may be used while remaining within the scope of the present claims.

In exemplary embodiments of the present invention, a collection of raw electronic data is obtained for a plurality of online entities and users. The raw data may be used by a training system to develop a classifier for identifying a target class within the data. Selected portions of the raw data may be presented by the training system to a trainer. The trainer provides input to the training system regarding whether an identified data field contains data of the target class. The input from the trainer may be used by the training system to develop the classifier. When a sufficient amount of the raw data has been labeled by the trainer as belonging to the target class, the training system may automatically apply the classifier to the remaining data to identify additional target classes within the remaining data. As used herein, the term "automatically" is used to denote an automated process performed by a machine, for example, the computing device 102. Furthermore, in some embodiments, the electronic data may be pre-labeled.

Furthermore, the raw data may be divided into portions, referred to herein as "cases," wherein the data in each portion share some common characteristic, such as a common data structure or a common source, for example. The training system may present an entire case of data to the trainer for evaluation rather than just one example of the data field. Thus, different examples of the same data field may be available to the trainer in the context of an entire case, which may enable the trainer to more readily identify patterns that reveal the usage of the data field and lead to a more accurate labeling of the data field. Furthermore, several data fields may be labeled simultaneously, rather than one at a time.

In exemplary embodiments of the present invention, the classifier is automatically generated by statistical analysis of features that correspond to entire cases rather than individual instances or individual data fields. By incorporating features of entire cases, the context in which the data field is situated may be taken into account, which may result in a more robust classifier.

Furthermore, in exemplary embodiments of the present invention, the training system automatically selects which case to display to the trainer next, based on which case may provide more useful training data. To select a next case, the training system may generate an uncertainty score for each data field within a case that corresponds with a level of uncertainty regarding whether the data field includes information of the target class. The uncertainty scores may be used to determine which case to display. For example, a desirability factor may be generated for each case based, at least in part, on the uncertainty scores, and the case may be selected based, at least in part, on the desirability factor. In this way, the training system may prompt the trainer to label those cases that may be more useful in generating the classifier, and the classifier may be generated with less input from the trainer. Selecting the most beneficial cases to label may increase the accuracy of the classifier and reduce the amount of time and labor used to develop the classifier.

FIG. 1 is a block diagram of a computer system 100 that may be used to develop a classifier, in accordance with exemplary embodiments of the present invention. As illustrated in FIG. 1, the computer system 100 may include one or more client systems 102 communicatively coupled to a server 104. The client systems 102 will generally have a processor which may be connected through a bus to a display and one or more input devices such as a keyboard a mouse or touch screen. The client systems 102 may also include tangible, machine-readable storage media, such as a storage system for the long-term storage of operating programs and data, including the programs and data used in exemplary embodiments of the present techniques. Further, the client systems 102 can have one or more other types of tangible, machine-readable media, such as a random access memory (RAM) for the temporary storage of instructions and data created during the operation of various programs.

The client systems 102 may be communicatively coupled to the server 104 through a local area network (LAN), a wide-area network (WAN), or another network configuration. The server 104 may have a machine-readable media, such as storage array, for storing enterprise data, buffering communications, and storing operating programs of the server 104. Through the server 104, the client systems 102 can access a search engine site 106 connected to the Internet 108. In exemplary embodiments of the present invention, the search engine 106 includes generic search engines, such as GOOGLE™, YAHOO®, BING™, and the like. The client systems 102 can also access Websites 110 through the Internet 108. The Websites 110 can have single Web pages, or can have multiple subpages. Although the Websites 110 are actually virtual constructs that are hosted by Web servers, they are described herein as individual (physical) entities, as multiple Websites 110 may be hosted by a single Web server and each Website 110 may collect or provide information about particular user IDs. Further, each Website 110 will generally have a separate identification, such as a uniform resource locator (URL), and will function as an individual entity.

The Websites 110 can also provide search functions, for example, searching subpages to locate products or publications provided by the Website 110. For example, the Websites 110 may include sites such as EBAY®, AMAZON.COM®, WIKIPEDIA™, CRAIGSLIST™, CNN.COM™, and the like. Further, the search engine site 106 and one or more of the Websites 110 may be configured to monitor the online activity of a visitor to the Website 110, for example, regarding searches performed by the visitor.

The client systems 102 and server 104 may also be able to access a database 112, which may be connected to the server 104 through the local network or to an Internet service provider (ISP) on the Internet 108, for example. The database 112 may be used to store a collection of electronic data to be processed in accordance with exemplary embodiments of the present inventions. As used herein, a "database" is an integrated collection of logically related data that consolidates information previously stored in separate locations into a common pool of records that provide data for an application.

The system 100 may also include a classifier 114 that may be used to identify a target class of information within the collection of electronic data, in accordance with exemplary embodiments of the present invention. The classifier 114 may be located in the client systems 102 or in the server 104. Furthermore, one or more of the clients 102 may also be used in the development of the classifier 114. Accordingly, one or more of the clients 102, or the server 104, may include a training system 116. In some embodiments, the training system 116 obtains a collection of raw electronic data from the database 112, for example. The training system may group the raw data into portions referred to herein as "cases," which are discussed further below. In other exemplary embodiments, the grouping of the raw data into cases is performed by a separate system and provided to the training system. The training system 116 may present cases to one or more trainers and the trainer may provide training information to the training system 116 in the form of labels that are applied to each of the data fields in the presented case. As used herein, a "positive" label indicates that the instance does belong to the target class, and a "negative" label indicates that the instance does not belong to the target class. The training data may be used to develop the classifier 114, which may be applied to the remainder of the raw data.

Each of the client systems 102 may include a case viewer 118 that receives the cases from the training system 116 and prompts the trainer to label the data fields of the case. The case viewer 118 may generate a graphical user interface (GUI) that enables the trainer to view the data received from the training system 116 and label the data fields that the trainer has identified as belonging to a target class. Exemplary techniques for displaying cases to a trainer using a GUI are discussed further in the commonly assigned and co-pending U.S. patent application Ser. No. 12/618,159, filed on Nov. 13, 2009, entitled "Method and System for Developing a Classification Tool," by Evan R. Kirshenbaum, et al., which is hereby incorporated by reference as though fully set forth in its entirety herein.

In exemplary embodiments of the present invention, the training system 116 and the case viewer 118 are included on a single client system 102. The cases generated from the raw electronic data may be provided to the client system 102 via a storage medium, for example, the database 112, a portable storage medium such as a compact disk (CD), and the like. The client system 102 may generate the classifier 114 using training data generated by the trainer via the client system 102. In other exemplary embodiments, the training system 116 is included on the server 104 and the case viewer 118 may be included on one or more of the client systems 102 so that more than one trainer may provide training data to the training system through a network. In such embodiments, the server 104 may operate the training system 116 by sending cases to the case viewers 118, receiving training data from the case viewers 118, and developing the classifier 114 based on the training data. Furthermore, it will be appreciated that the above system description represents only a few of the possible arrangements of a system for developing a classifier in accordance with embodiments of the present invention.

Figure 2:
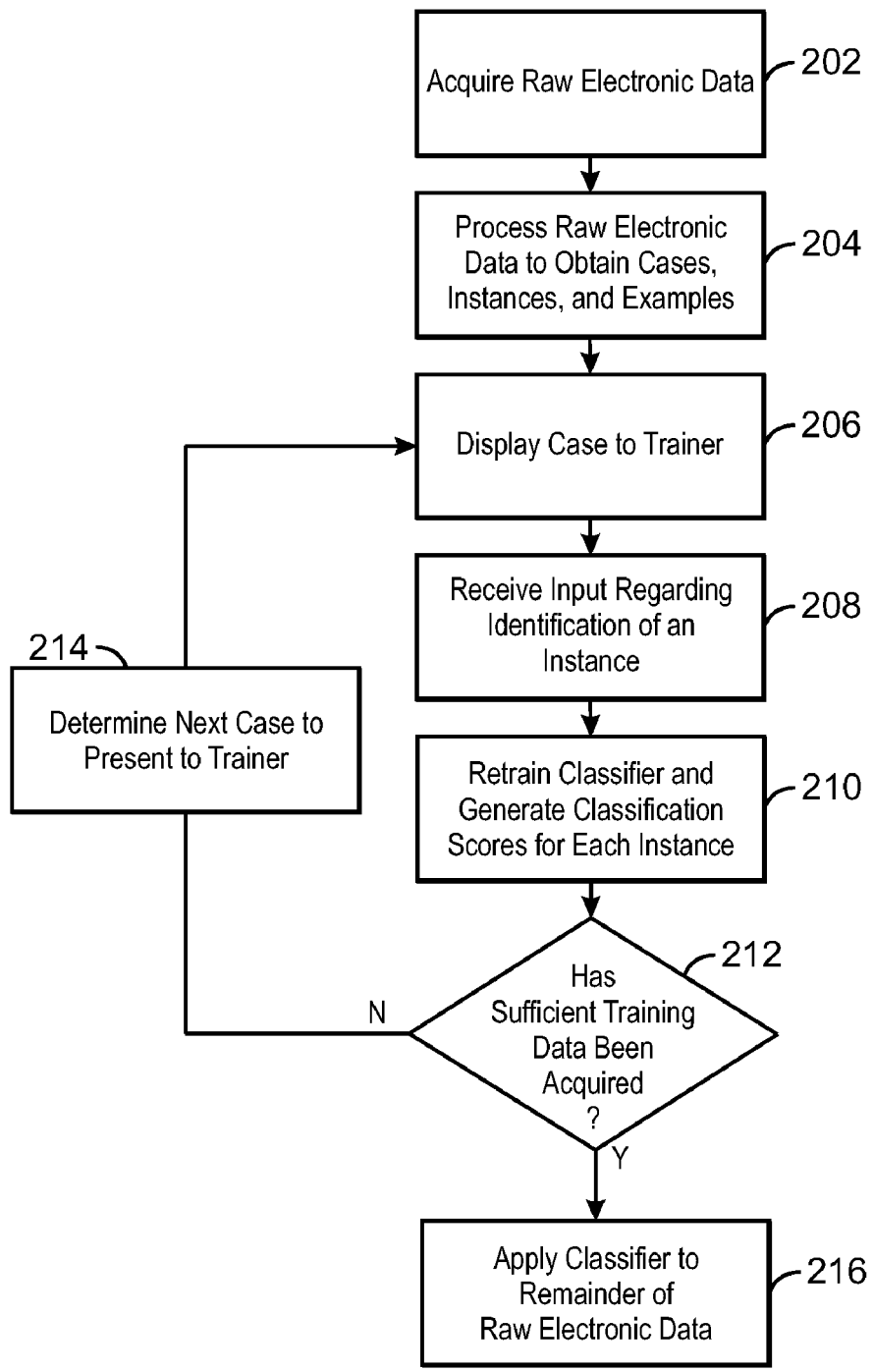
FIG. 2 is a process flow diagram of a method for developing a classifier, in accordance with exemplary embodiments of the present invention.

FIG. 2 is a process flow diagram of a method for identifying a target class of information within a collection of electronic data, in accordance with exemplary embodiments of the present invention. The method is generally referred to by the reference number 200 and begins at block 202, wherein a collection of raw electronic data may be obtained. The raw electronic data may include any suitable electronic data and the target class of information may be any type of useful information that may be included in the raw electronic data. In some exemplary embodiments, the raw data includes Web activity data for a plurality of Internet user IDs generated at a plurality of Websites. For example, the raw electronic data may include records of the Web pages visited by individual browsers, the Hyper Text Markup Language (HTML) content of Web pages, the results of Web searches that have been performed at various Websites, and the like. In other embodiments, the raw electronic data includes any suitable electronic documents, for example, scanned documents, Adobe® Portable Document Format (PDF) files, Microsoft® Office documents, eXtensible Markup Language (XML) files, database tables, Semantic Web ontologies, picture files, audio files, or the like.

In exemplary embodiments of the present invention, the raw electronic data includes URL data obtained by directly monitoring Web activity on the Internet generated at a plurality of Websites by plurality of Internet browsers. For example, with reference to FIG. 1, the server 104 may monitor the online activity of the client systems 102. In other exemplary embodiments, the URL data is obtained from a third party, such as one or more Websites 110, an internet service provider (ISP), internet monitoring service, search engine site 106, and the like. Furthermore, in some embodiments the URL data may be obtained from the website logs of multiple organizations' Websites. In some embodiments, URL data may be obtained by gathering click-stream logs from multiple users via monitoring software installed on their client computers (either in the OS or in the browser or separate opt-in service). In some embodiments, URL data may be obtained by collecting the click-stream logs observed by one or more ISPs or Internet backbone providers that monitor Web traffic from many users to many Websites.

Next, at block 204, the raw data may be processed to obtain cases, instances, and examples. The term "example" is used to refer to a grouping of data field values that have a common source, for example, the same query URL, the same record of a database table, and the like. The term "case" is used to refer to a collection of examples whose data fields co-occur in a way that enables the data fields to be grouped together across several examples into instances, which may be processed as a group by the training system. In various embodiments, a case may include query URLs directed at the same Website or same on-line store, records in the same database table, and the like. Each case may include one or more instances and one or more examples. Each instance may include a plurality of instance values each of which corresponds with a data field value from a single example. In some embodiments, an instance includes a plurality of instance values corresponding to a single example. Furthermore, in some embodiments, the electronic data obtained at block 202 may have been previously grouped into cases, and block 204 may be skipped.

In an exemplary embodiment of the present invention, the collection of raw data is information in a database, and the target class is a product name column. In this example, each database table may be a case, each column in a database table may be an instance, and each database table row may be an example. In another exemplary embodiment, the collection of raw data includes Web pages, and the target class may be content text as opposed to boilerplate or advertisements. In this example, the collection of Web pages for an entire Website 110 may be a case, the HTML elements, HTML CLASS attribute values, or XPath expressions identifying portions of pages may be instances, and particular Web pages may be examples. In another exemplary embodiment, the raw data may include images, and the target class may be female faces in the image. In this example, individual photographs may be cases, identified faces may be instances, and each case may have only one example.

For purposes of clarity, the embodiments of the present invention described in detail herein may refer to raw data that includes query URLs that have been generated by a plurality of users at a plurality of Websites, and the target class is may be a data field that includes search terms entered by a user. A query URL will often be of the form:

http://www.website.com/a/b/c?k1=v1&k2=v21+v22&k3=v3

In this query URL, the hostname is the portion of the URL that precedes the first single forward slash, in this case "http://www.website.com". The path is everything from the first single forward slash (when one exists) that precedes the question mark, in this case "/a/b/c". The query portion of the query URL is everything that follows the question mark. As used herein, the term "Website name" is used to refer to any combination of components from the hostname and components from the path. Furthermore, the query portion of the query URL may include one or more data fields, which may be separated by ampersands. Each data field may include a data field name, e.g., "k1," and a data field value, e.g., "v1." In the example query URL provided above, the query URL includes three data fields, namely "k1," which has the value "v1," "k2," which has the value "v21+v22," and "k3," which has the value "v3."

It will be appreciated that the naming convention used herein is hypothetical and that any suitable character string may be used to represent the various data field names and values used in an actual query URL. The naming convention used in the query URL may be an ad hoc convention designated for a single Web form or Website. Therefore, a common naming convention used across the multiple Websites may not be available. For example, a hypothetical query field named "q" may refer to different types of data. In one query URL, "q" may refer to data field that holds a search term entered by a user. However, in another query URL, "q" may refer to something different, for example a data field that holds a desired quantity of a product. Moreover, a tool for translating between the various naming conventions is not normally available. According to exemplary embodiments of the present invention, the training system develops a classifier 114 that is able to accurately identify certain data fields in a specific query URL as belonging to a specified class, despite the fact that the specified class is not represented in a consistent manner across multiple query URLs.

In exemplary embodiments wherein the raw data comprises query URLs, each query URL may be considered an example, and the examples may be grouped together into cases. Each case may include a collection of query URLs that correspond in some way. Furthermore, each case may include one or more instances that correspond with the data fields included in each of the query URLs in the case. Each instance may have an instance name that corresponds with the text string that represents the data field name in the query URLs. Each instance may also have a plurality of instance values, one for each occurrence of the named data fields in the examples, corresponding to the data field values included in the query URLs. Furthermore, the query URLs that are grouped together into a case may have varying data field names. Thus, one or more examples in a case may not have a data field value for a particular instance. For the purpose of clarity, an instance is said to "occur" within an example if the query URL corresponding with the example includes the data field name corresponding with the instance.

The instance names and values may be extracted from the query URLs by textual parsing of the query URL. In some exemplary embodiments, the processing of the raw URL data discussed in relation to block 204 is executed by the training system 116. In other embodiments, the process discussed in relation to block 204 is executed separately, and the case data generated from the raw query URL data may be stored in a database that is accessible to the training system 116. Exemplary techniques for generating cases from query URLs are discussed further in the commonly assigned and co-pending U.S. patent application Ser. No. 12/618,170, filed on Nov. 13, 2009, entitled "Method and System for Segmenting Query URLs," by Shyam Sundar Rajaram, et al., which is hereby incorporated by reference as though fully set forth in its entirety herein.

Next, at block 206, one or more of the cases may be presented to a trainer in order to obtain training information that may be used to generate the classifier 114. The training system 116 of FIG. 1 may be operating on the server 104, and the training system 116 may send the case to one or more of the client systems 102. Each of the client systems 102 may present the case to the trainer via the case viewer 118. In exemplary embodiments, the trainer is a person, and the client system 102 may display the case to the trainer via a display coupled to the client system 102. The trainer may also be an animal, a neural network, a program, or any other decision-making tool that can make a binary classification decision or any tool or entity based up on whose behavior a binary classification decision can be made.

Next, at block 208, the training system 116 may receive input regarding identification of an instance from a trainer. In providing this input, the trainer may label one or more of the case's instances as belonging to one or more target classes. By way of example, the trainer may click on a table column or checkbox corresponding to the instance. In some exemplary embodiments, the trainer provides a confidence value that reflects the trainer's level of confidence that the instance is of the target class. For example, the trainer may score an instance on a scale of 1 to 5, 1 indicating a high level of confidence that the instance is not of the target class, and 5 indicating a high level of confidence that the instance is of the target class. The confidence value may be taken into account in generating the classifier 114. In other exemplary embodiments, the trainer simply provides a positive or negative indicator for each instance, indicating the trainer's best judgment about whether the instance is of the target class. In some embodiments, one or more cases may be presented to at block 208 and the determination of the instance identifications for some or all of the presented cases may require prolonged activity, such as running experiments, conducting surveys, analyzing data, or purchasing information. In such embodiments, there may be a substantial delay and a tear-down and reestablishment of a user session between blocks 206 and 208.

Next, at block 210, the classifier 114 may be retrained based on the training information received from the trainer. In exemplary embodiments of the present invention, the classifier 114 is retrained using a supervised machine-learning algorithm, for example, a Naïve Bayes algorithm, support vector machine, and the like. After retraining the classifier 114, the classifier 114 may be used to compute a classification score for each instance of each case, the classification score corresponding with a likelihood that the instance is of the target class. Furthermore, a threshold value may be specified, which the training system compares against the classification score to determine whether the instance belongs to the target class. For example, the classification scores may be normalized to a range of between zero and one, zero indicating a low probability and one indicating a high probability. Furthermore, the threshold may be specified as 0.5, so that instances with a classification score greater than 0.5 may be considered to be of the target class, while instances with a classification score less than 0.5 may be considered to not be of the target class. It will be appreciated that the classification score range and threshold value considered above is only one possible embodiment, and that other ranges and threshold values may be used, depending on system design considerations. Furthermore, the threshold value may be other than in the middle of the classification score range. For example, a higher threshold value may be specified in order to identify instances that have a higher degree of probability of belonging to the target class. In some embodiments, the threshold used may change over time. In such embodiments, the threshold used may depend on the result of computing classification scores for labeled cases. In some embodiments, lower classification scores are used to indicate of greater likelihood of belonging to the target class compared to higher classification scores.

In exemplary embodiments of the present invention, the classification scores are computed by generating features for each instance and comparing the features of the labeled instances with the features of the unlabeled instances. As used herein, the term "feature" is used to refer to a characteristic of an instance that may be used to detect correlations between instances. For example, some features may relate to statistical characteristics of the instance values included in an instance. The classification scores computed for each of the unlabeled instances will correspond to the level of similarity between the unlabeled instance features and the labeled instance features. An unlabeled instance that has features that are similar to the labeled instances of the target class may receive a high classification score corresponding with a high level of likelihood that the unlabeled instance is of the target class.

Furthermore, the instance features may be "instance-centric," "case centric," or some combination thereof. As used herein, an "instance-centric" instance feature is a feature relating to some aspect of an individual instance without regard for the other instances in the same case, for example, the number of letter characters in the instance, the percentage of letter characters relative to numerical characters in the instance, and the like. One example of an instance-centric feature may include the percentage of instance values that are unique for a particular instance, e.g., occur only once within the instance. Another example of an instance-centric feature may include the percentage of examples that are unique, e.g., the combination of instance values within the example occurs only once within a case. Another example of an instance-centric feature may include the percentage of examples that are missing or empty for a particular instance.

Further examples of instance-centric features that may include, but are not limited to the minimum, maximum, median, mean, and standard deviation of individual string features over the data field values within an instance. The individual string features may include values such as the string length, the number of letters in the string, the number of words in the string, the number of whitespace characters in the string, and whether the string is all whitespace. Additional string features may include the number of characters in the string that are capitalized, the number of lowercase characters in the string, the number of numerical values in the string, and the average word length of the string. Further string features may include the number of control characters in the string, the number of hexadecimal digits or non-hexadecimal letters in the string, the number of non-ASCII characters in the string, the number of individual punctuation characters ("@", ".", "$", "_", etc.) in the string, and the like. In some embodiments, "instance-centric" features further relate to metadata associated with the corresponding fields rather than the instance values. For example, "instance-centric" features may be based on a tag, keyword, or name of the field, alone or in the context of similar metadata for other instances in the case. One or more of the instance-centric features described above may be computed for each instance. Each of the features computed for a particular instance may be stored to a corresponding feature vector of the instance.

In other exemplary embodiments, an instance-centric feature may include the data field name corresponding to a particular instance or some property of the data field name, such as the length or initial character. For example, if the target class is a data field corresponding to an author of an article, the data field name "AU" may provide some evidence that the corresponding data field value identifies an author. Thus, the data field name corresponding to an instance may be used, in addition to other features, to determine whether the instance belongs to the target class. The data field name may be represented in the feature vector as a text string corresponding to the data field name or a hash of the text string.

As stated above, the instance features computed at block 210 may also be case-centric. Furthermore, the feature vector corresponding with each instance may include a combination of instance-centric and case-centric instance features. As used herein, a "case-centric" instance feature is a characteristic of the instance that takes into account some aspect of the case in which the instance is grouped. For example, a case-centric instance feature may be based on multiple instances in the same case. In one exemplary embodiment, case-centric features are computed by normalizing an instance-centric feature based on the values computed for the instance-centric feature over instances in that case. For example, the instance features may be normalized at block 210 according to the formula:

$$f'(I) = \frac{f(I) - \min_{\hat{I} \in class(I)} f(\hat{I})}{\max_{\hat{I} \in class(I)} f(\hat{I}) - \min_{\hat{I} \in class(I)} f(\hat{I})}$$

In the above formula, f'(I) equals the normalized, case-centric instance feature, f(I) equals the instance-centric feature value. Max f(Î) equals the maximum instance feature value computed for the particular feature over all of the instances in the particular case. Min f(Î) equals the minimum instance feature value computed for the particular feature over all of the instances in the particular case. The resulting case-centric instance feature values may be in the range of zero to one for each of the instances.

Instance features may also be normalized by dividing each feature by the sum of the feature values computed for a particular feature over instances in that case. For example, case-centric feature values may be computed at block 210 according to the formula:

$$f'(I) = \frac{f(I)}{\sum_{\hat{I} \in C} f(\hat{I})}$$

In the above formula, $\Sigma_{\hat{I} \in C} f(\hat{I})$ equals the sum of the features values of a particular feature for all of the instances in the particular case.

In some embodiments, the normalization may place with respect to a subset of the other instances in the case. In some such embodiments, the subset may represent all instances that correspond to fields that occur in at least a minimum number of examples that a field that corresponds to the particular instance also occurs in or co-occur with the particular instance's fields in at least a minimum fraction of the number of examples the particular instance's fields occur in. In some such examples, the normalization may include a weighting factor based on the relative numbers of examples in which both instances' fields co-occur and in which (at least) the particular instance's fields occur. In some such examples, the normalization may be based on derived features reflecting a restriction to those examples in which both instances' features co-occur. For example, if the feature in question is the average word length, the particular field corresponds to field "q", and the case also has instances corresponding to fields "r", and "s", the derived feature would be the average word length, the average taken over only those examples for which both field "q" and the other instances' fields occur, that is, those that included "q", those that included "q" and "r", those that included "q" and "s", and those that included "q", "r", and "s", but not any examples that did not include "q".

Instance features may also be normalized based on the standard deviation of the instance feature values above or below the mean or median of the feature values within the case for the particular feature. For example, case-centric feature values may be computed at block 210 according to the formula:

$$f'(I) = \frac{f(I) - \overline{f_c}}{\sigma_{f,c}}$$

In the above formula, $\overline{f_c}$, equals the mean of the instance feature values and, $\sigma_{f,c}$ equals the standard deviation of the instance feature values of a particular feature over all of the instances in a case.

In some exemplary embodiments, case-centric instance features are based on a ranking of other instance features computed for the case, where the other features may be case-centric or instance-centric. For example, an ordinal rank may be computed for each instance of the case based, in part, on the value of the other feature, and the case-centric instance feature may be based on the computed rank. Thus, for example, if the other feature is based on the number of distinct values in the instance, the instance in the case with the most distinct values may have a case-centric instance feature value of one, the instance in the case with the next largest number of distinct values may have a case-centric instance feature value of two, and so on. The ranking may also be computed as a fraction of the number of instances in the case. Thus, for example, the case-centric instance feature may be computed by dividing the number of distinct values in the instance by the number of instances in the case. To induce a ranking, relatively lower or relatively higher values may be specified as corresponding to relatively lower ranks, and the specification may be different for different case-centric instance features.

In some embodiments, a case-centric instance feature may be based on a ranking involving more than one other instance features, where such other instance features may be case-centric or instance-centric. In some such embodiments, a case-centric instance feature may be based on an arithmetic combination of two or more other features, for example, a ratio, a product, or a weighted sum. In other such embodiments, a case-centric instance feature may be based on rankings of the instances in a case derived from two or more other features. For example, a first instance may receive a lower rank than a second instance if the first instance has a lower value than the second instance for a first feature or if the first instance has the same value as the second instance for the first feature and a lower value than the second instance for a second feature. In such a "lexicographic ordering", the second (or following) feature is used to break ties.

In some embodiments, the case-centric instance features may be based on data field names (or other metadata) associated with the instance and data field names associated with other instances in the case. For example, if the target class is an instance corresponding to an author of an article, and the case includes an instance named "AU," the presence of additional instances within the case that have instance names of "TI" and "YR" may provide additional evidence that the instance named "AU" identifies an author. In some such embodiments, these case-centric instance features may be Boolean features reflecting a specific field name being associated with the instance with which the feature is being computed and a specific field name being associated with another instance in the case. In the prior example, there might be a Boolean feature whose value is computed to be true when the instance is associated with a field named "AU" and another instance in the case is associated with a field named "TI". In some embodiments, the feature may be computed to be true only when the two instances are associated with fields that co-occur in at least a specified number of examples or at least a specified fraction of the examples the instance occurs in. In some embodiments the feature may be a numeric feature whose value is computed based on the number or fraction of examples the instance occurs in that the other instance also occurs in. In some embodiments there may be case-centric features for all occurring field name combinations, while in other embodiments, there may be features for only a subset of field name combinations, such as, for example, a specified set of combinations, or only combinations determined to be sufficiently indicative of the instance being or not being in the target class. In some embodiments the feature may be identified by combining hash values computed based on each of the field names involved. In some embodiments, case-centric features may be based on the co-occurrence between a field name associated with the instance and more than one other field name associated with instances in the case.

Continuing at block 210, in some embodiments, one case-centric instance feature may have as a value an estimate of the likelihood of the instance being positive based on data field names (or other metadata) for the instance and other instances and the presence of such combinations among labeled instances. In an exemplary embodiment, for each combination used, separate counts are kept of the number of cases that represent occurrences of the combination and that are labeled, respectively, positive and negative. Based on these counts, a known-method technique such as Naïve Bayes is used to determine a likelihood, based on the combinations that describe an instance, that the instance is positive, and this likelihood (or a value derived from it) is used as a feature value for the instance. When input is received at block 208 regarding identification of instances as positive or negative, the counts associated with field name combinations that describe these instances are adjusted and, based on the adjusted counts, the case-centric feature is recomputed for all instances. In some embodiments, the case-centric feature may be recomputed only for instances described by combinations whose counts were adjusted. In some embodiments, the likelihood may be further based on the field name associated with the instance by itself and separate counts of positive and negative labeled instances with each field name maintained. In some embodiments there may be separate features representing the likelihood based on the field name alone and based on the field name in combination with other field names.

Another example of a case-centric instance feature may include a measure of the instances that co-occur within a given case. Instances may be considered to co-occur if both of the instances occur together in the same example. For the purpose of clarity, the term "instance A" is used to differentiate between the instance for which a particular instance feature is being computed and the other instances in the same case. In some exemplary embodiments, a case-centric feature of an instance A includes the number of other instances that co-occur with the instance A throughout all of the examples in the case. Another case-centric feature of an instance A may include a statistical measure of the number of other instances that occur in examples that also include the instance A. In such embodiments, the statistical measure may include the mean, median, max, min, or standard deviation, for example.

As noted above, the instance features may be used to generate classification scores for each instance, and the classification scores may be used to identify instances that are likely to belong to a specified target class. Additionally, the classification scores computed for each unlabeled instance may also be used to determine which case to provide to the trainer next, as discussed below in reference to block 214. After retraining the classifier and generating classification scores for each instance, the process flow may advance to block 212.

At block 212, a determination may be made regarding whether the training system 116 has received sufficient training data. In some exemplary embodiments, the training system 116 is programmed to obtain training data for a specified number of cases or a specified group of cases. Accordingly, the training system 116 may determine that sufficient training data has been acquired when the specified number or group of cases have been processed.

In some exemplary embodiments, the training system 116 executes an evaluation routine that evaluates the quality of the classifier 114. The training system 116 may apply the classifier 114 to a group of cases whose instance labels are known, for example, cases that have already been labeled by the trainer. As discussed in relation to block 210, classification scores may be computed for each labeled instance by computing values for instance-centric and/or case-centric features for each instance. The classifier 114 developed by the training system 116 up to this point may be used by the training system 116 to determine whether each instance is of the target class based the classification scores generated for each instance. The results generated by the current classifier 114 may be compared to the known instance labels to determine the quality of the classifier 114. In some embodiments, a set of labeled instances or the instances associated with a set of labeled cases are withheld from use in training the classifier 114 and are only used for evaluating the performance of the classifier 114. In other embodiments, the labeled cases may be divided into several sets or "folds," and the accuracy of the classifier 114 may be evaluated using cross-validation. In cross-validation, two or more classifiers may be developed based on training data received for different folds. The accuracy of each classifier may be determined using the labeled instances associated with the other folds that were not used in training the particular classifier, and these accuracy measures may be used to estimate the accuracy of classifier 114.

In some exemplary embodiments, a set of evaluation parameters may be computed based on the comparison of the classification scores and the instance labels. One exemplary evaluation parameter may include an accuracy parameter, Acc, which describes the fraction of test instances that are classified by the classifier correctly, i.e., in agreement with the labels assigned by the trainer. Another evaluation parameter may include a precision parameter, P, which describes the fraction of instances classified as positive that were also labeled positive. Another evaluation parameter may include a recall parameter, R, which describes the fraction of instances labeled positive that were also classified positive. Another evaluation parameter may include an F-measure, F, which is a harmonic mean of precision and recall, e.g., $2*P*R/(P+R)$. One or more of the evaluation parameters may be compared with corresponding evaluation thresholds to determine whether the classifier is performing according to a specified performance criteria.

In one exemplary embodiment of the present invention, at block 212 the evaluation parameters may be computed for each case individually and combined to generate composite evaluation parameters. In such an embodiment, the classification scores for each instance of a case may be compared to the classification threshold to determine whether the instance is classified as belonging to the target class. By comparing the classification results for each instance to the corresponding instance label, the instance may be identified as corresponding with one of four possible outcomes. Namely, the instance may be identified as a true positive, a true negative, a false positive, or a false negative. A true positive may occur when the instance is classified as belonging to the target class and the instance is labeled positive. A true negative may occur when the instance is classified as not belonging to the target class and the instance is labeled negative. A false positive may occur when the instance is classified as belonging to the target class and the instance is labeled negative. A false negative may occur when the instance is classified as not belonging to the target class and the instance is labeled positive.

Each instance of a case may be processed as described above to obtain separate tallies of the true positives, TP, true negatives, TN, false positives, FP, and false negatives, FN, identified for the case. The evaluation parameters for an individual case may be calculated at block 212 from the tallies according to the following formulas:

$$Acc = \frac{TP + TN}{TP + TN + FP + FN}$$

$$P = \frac{TP}{TP + FP}$$

$$R = \frac{TP}{TP + FN}$$

$$F = \frac{2PR}{P + R} = \frac{2TP}{2TP + FN + FP}$$

The evaluation parameters calculated for the individual cases may be combined to generate composite evaluation parameters for the classifier. For example, the evaluation parameters may be averaged across all of the labeled cases.

In some embodiments, a weighting value may be applied during the counting of the true positives, true negatives, false positives, and false negatives identified for the individual case. For example, at block 212 true positives may be assigned a decreasing weight value according to the following formula:

$$TP_k = \frac{2^{-k}}{1 - 2^{-n}}$$

In the above formula, $TP_k$ equals the weight value added to the total count, TP, for the $k^{th}$ true positive identified in the case, and n equals the number of instances in the case that are labeled positive. In another exemplary embodiment, at block 212, true positives may be assigned a decreasing weight value according to the following formula:

$$TP_k = \frac{(n - k + 1)}{\sum_{i=1}^{n} i}$$

In another exemplary embodiment of the present invention, the classifier is evaluated by comparing the classification scores for each instance of a case to one another to identify the instance within the case that has the highest classification score. If the identified instance exceeds the classification threshold, the case is identified as having an instance of the target class. By comparing the results for each case to the labeling data of the case, the case may be identified as corresponding with one of five possible outcomes. Namely, the case may be identified as a correct positive, correct negative, missed positive, missed negative, or a wrong positive. A correct positive occurs when the case is identified as having an instance of the target class and the identified instance is labeled positive. A correct negative may occur when the case is identified as not having an instance of the target class and all of the instances of the case are labeled negative. A missed positive may occur when the case is identified as not having an instance of the target class but at least one of the instances is labeled positive. A missed negative may occur when the case is identified as having an instance of the target class but none of the instances are labeled positive. A wrong positive may occur when the case is identified as having at least one instance of the target class, but the identified instances are labeled negative, and at least one other instance in the case is labeled positive. In other words, for a wrong positive, the case was correctly identified as having at least one instance of the target class, but the identified instance(s) were not actually labeled positive.

Each of the labeled cases may be processed as described above to obtain separate tallies of the correct positives, CP, correct negatives, CN, missed positives, MP, missed negatives, MN, and wrong positives, WP, identified for the case. The evaluation parameters may be calculated at block 212 from the tallies according to the following formulas:

$$Acc = \frac{CP + CN}{CP + CN + MP + MN + WP}$$

$$P = \frac{CP}{CP + MN + WP}$$

$$R = \frac{CP}{CP + MP + WP}$$

$$F = \frac{2PR}{P + R} = \frac{2CP}{2CP + MN + MP + 2WP}$$

The evaluation parameters may be compared with the corresponding evaluation thresholds to determine whether the classifier is performing according to the specified performance criteria. The evaluation parameters used to determine the performance of the classifier may include any combination of one or more of the evaluation parameters described above, depending on system design considerations. If the classifier is determined to perform adequately, then sufficient training data has been received by the training system 116, and the process flow of method 200 may advance to block 214.

At block 214, the training system 116 determines a next case to present to the trainer. The next case may be determined randomly or determined based on some property of the cases. For example, the remaining unlabeled cases may be ranked according to the number of examples or the number of instances included in each case, and the case with the greatest number of examples or instances may be presented to the trainer next. In this way, the cases that are likely to provide a greater amount of training data may be presented earlier, thus reducing the amount of time used to develop the classifier.

In exemplary embodiments of the present invention, the classification scores generated for the unlabeled cases at block 210 are used to determine the next case to present to the trainer. In such an embodiment, a desirability factor, D, may be computed for each case corresponding with a level of desirability of selecting the corresponding case as the next case for which to obtain training data. A higher desirability factor may reflect the fact that the corresponding case would be expected to provide more useful training data when the case has been labeled by the trainer. The case with the highest desirability factor may be selected as the next case to present to the trainer. In some embodiments a batch of cases having the highest desirability factors may be selected to be the next several cases to present to the trainer. In some embodiments, the case or cases selected may be those having the highest desirability factor out of a subset of potential next cases to present. In some embodiments the next case may be selected based on the desirability factor, but a case other than the case with the highest desirability factor may be selected, with cases with relatively higher desirability factors being chosen with higher probability than cases with relatively lower desirability factors.

The desirability factor for a given case may be computed based on uncertainty values computed for each instance within the case corresponding to a degree of uncertainty regarding whether the instance is of the target class. For example, a high classification score for an instance may correspond with a high level of probability that the instance is of the target class, while a low classification score may correspond with a high level of probability that the instance is not of the target class. For both high classification scores and low classification scores, the uncertainty value computed for the instance may be low. However, for an instance that has a classification score close to the classification threshold (above or below), the uncertainty value computed for the instance may be high. In an exemplary embodiment, the uncertainty value is computed at block 214 according to the following formula:

$$unc(I) = \begin{vmatrix} \frac{score(I)}{\theta} & \text{If } score(I) \le \theta \\ \frac{1 - score(I)}{1 - \theta} & \text{If } score(I) > \theta \end{vmatrix}$$

In the above formula, unc(I) is the uncertainty value for the instance, I, score(I) is the classification score computed for the instance, I, and $\theta$ is the classification threshold. Using the above formula, the uncertainty value ranges from zero to one and decreases linearly in proportion to the distance between the classification score and the classification threshold. In another exemplary embodiment, the uncertainty value is computed as the absolute value of the difference between the score and the threshold.

Continuing at block 214, in one exemplary embodiment, the desirability factor for a case is computed as the maximum uncertainty value computed for all of the instances within a case. In this way, the case with the highest uncertainty value for an individual instance may be selected as the next case. In another exemplary embodiment, the desirability factor may be computed as the average uncertainty for all of the instances in a case. In another exemplary embodiment, the desirability factor is computed as the sum of the uncertainty values for all of the instances in the case. In another exemplary embodiment, the desirability factor is computed as the sum of the uncertainty values for a number, N, of the instances in the case with the highest uncertainty value. In this example, N may be determined based on a distribution of the number of instances in each case. For example, N may equal the median number of instances in all of the cases. In this way, the desirability factors computed for cases with large numbers of instances may be more comparable to the desirability factors computed for cases that include fewer instances. In some embodiments, N may be a specified value, such as 3.

In some exemplary embodiments, the total uncertainty value for the case may be computed by modifying the uncertainty values and adding the modified uncertainty values to the total uncertainty value. For example, the uncertainty value may be modified to fall off faster than linearly in proportion to the distance between the classification score and the classification threshold. In one exemplary embodiment, the desirability factor may be computed at block 214 according to the following formula:

$$D(C) = \sum_{I \in C} \frac{1}{1 - unc(I)}$$

In the above formula, D(C) equals the desirability factor for the case, C. Using this formula, the uncertainty value for each instance is modified to decrease with the reciprocal of the distance between the classification score and the threshold. In some embodiments when the denominator is closer to zero than a specified small constant, that constant is substituted. In some embodiments, a specified small constant is added to the denominator to ensure that it can never be zero.

In another exemplary embodiment, the desirability factor may be computed at block 214 according to the following formula:

$$D(C) = \sum_{I \in C} unc(I)^2$$

Using the above formula, the uncertainty value for each instance is modified to decrease quadratically as the distance between the classification score and the classification threshold increases.

In another exemplary embodiment, the desirability factor may be computed at block 214 according to the following formula:

$$D(C) = \sum_{I \in C} 2^{\frac{-1}{unc(I)}}$$

Using the above formula, the uncertainty value for each instance is modified to decrease exponentially as the distance between the classification score and the classification threshold increases.

In some exemplary embodiments, each of the instances in the case may be ranked based on the uncertainty values. For example, a rank, $\rho_c(I)$, may be defined wherein $\rho_c(I)$ equals zero for the most uncertain case and $\rho_c(I)$ equals the number of instances in the case minus one for the least uncertain case. Using this rank, the desirability factor, computed based on uncertainty as in one of the ways previously described, may be further modified by means of a component that varies with the rank. For example, the desirability factor may be computed at block 214 according to the following formula, in which the contribution due to the uncertainty rises linearly with the value of uncertainty and the contribution due to uncertainty rank falls exponentially with the rank:

$$D(C) = \sum_{I \in C} \frac{unc(I)}{2^{\rho_c(I)}}$$

Using the above formula, the uncertainty value is modified to decrease exponentially according to the rank, such that the highest ranked instance contributes the largest influence on the desirability factor and subsequent, lower-ranked instances contribute a decreasing influence on the desirability factor, with the result that the same uncertainty will contribute half as much to the desirability factor for the second most uncertain instance as for the most uncertain instance. In some embodiments, the contribution due to rank may vary other than exponentially. Furthermore, in some exemplary embodiments, the computational techniques described above may be combined such that each uncertainty value contributes an uncertainty component that decreases in proportion to the difference between the classification score and the classification threshold and an uncertainty component that decreases according to rank. In some embodiments, the ranking of instances by uncertainty may be such that less uncertain instances have lower, rather than higher, ranks. In such embodiments, the contribution to the desirability factor based on uncertainty rank may be such that higher ranks result in lower contribution than lower ranks.

In some exemplary embodiments, the desirability factor may be based on the uncertainty value for the instance in the case with the highest classification score. In this way, the next case presented to the trainer may be the case with the highest uncertainty value for the instance in the case that is most likely to be of the target class. In such an embodiment, the desirability factor may equal the uncertainty value of the instance with the highest classification score. In another embodiment, the desirability factor may equal the sum of the uncertainty values of the N instances with the highest classification scores, where N equals a specified number of instances.

In some exemplary embodiments, the desirability factor may be based on the differences between the classification scores for instances in the case. In some data domains, cases may often have at most one instance that belongs to the target class. Thus, if a case includes multiple instances that have high classification scores (i.e., more than one instance is classified as positive) that are close to one another, this may indicate that the classifier has insufficient training data to appropriately differentiate between the instances. In such an embodiment, the cases may be ranked according to classification score such that $\pi_1$ is the instance with the highest classification score, $\pi_2$ is the instance with the next highest classification score, and so on. Using this ranking, the desirability factor may be computed at block 214 according to the following formula:

$$D(C)=1-|score(\pi_1)-\max(score(\pi_2),\theta)|$$

In the above formula, $\max(score(\pi_2),\theta)$ represents the maximum of the classification score for the next highest ranked instance and the classification threshold, $\theta$. Furthermore, in some exemplary embodiments, one or more of the highest ranked instances may be ignored in computing the desirability factor. In this way, a high desirability factor may be computed for cases that have one or more instances that are highly likely to belong to the target class and have close classification scores. For example, $\pi_2$ may be chosen as the instance (other than the instance with the highest classification score) with the highest classification score that is below a specified limit, for example, 0.9. For another example, $\pi_2$ may be chosen as the instance with the highest classification score whose classification score is at least a specified amount, for example, 0.05, below that of the instance with the highest classification score.

Continuing at block 214, in some exemplary embodiments, the desirability factor computed as described above may be weighted to account for the number of examples in the case. Thus, the modified desirability factor may equal the computed desirability factor multiplied by a weighting factor. The weighting factor may be a count of the number of examples in the case. The weighting factor may also equal the count of the number of examples in the case normalized to be a fraction of the number of examples in all cases or in some corpus. For example, one case may represent a website having 10,000 examples and a second case may represent a website having 250 examples—these numbers could be used as weights directly, or they could be normalized to a number between zero and one by dividing by the total number of examples in all cases. Furthermore, because the number of examples in each case may vary widely, the weighting factor may equal the logarithm of the example count or some other transformation of the example count.

In some exemplary embodiments, the desirability factor may be weighted to increase the desirability factor for groups of cases that are similar. In this way, the next case presented to the trainer may be a case that would be expected to provide useful training information pertinent to a large number of additional cases. A similarity-based weighting factor may be computed at block 214 by computing a Euclidean distance between instances according to the following formula:

$$\delta(I_1, I_2) = \sqrt{\sum_f (f(I_1) - f(I_2))^2}$$

In the above formula, $\delta(I_1,I_2)$ equals the distance between the instances $I_1$ and $I_2$ based on the feature values of those instances. Additionally, $f(I_1)$ equals the instance feature value, for each feature f, of a first instance, and $f(I_2)$ equals the instance feature value, for the same feature, of a second instance. The first and second instances may be instances from two different cases. The distance between cases may be computed based on the distances between instances in the case. For example, the distance between two cases may be computed at block 214 by according to the following formula:

$$\delta(C_1, C_2) = \min_{\substack{I_1 \in C_1 \\ I_2 \in C_2}} \delta(I_1, I_2)$$

In the above formula, $\delta(C_1,C_2)$ equals the distance between a first case, $C_1$, and second case, $C_2$, and is the distance between the two closest instances of the first case one and the second case.

In another exemplary embodiment, the distance between cases is computed at block 214 according to the following formula:

$$\delta(C_1, C_2) = \frac{1}{|C_1|} \sum_{I_1 \in C_1} \min_{I_2 \in C_2} \delta(I_1, I_2)$$

In the above formula, $|C_1|$ equals the number of instances in case, $C_1$. The distance, $\delta(C_1,C_2)$ equals the average distance between each of the instances in the second case and the closest instance in the first case. The similarity-based weighting factor for each unlabeled case may be computed by summing the distance between the case and each of the other unlabeled cases. Furthermore, the formula used may return a large weight factor for small distances. For example, the weighting factor for each case may be computed at block 214 by the following formula:

$$W_C = \sum_{\substack{C' \in unlabeled \\ C' \neq C}} 2^{-\delta(C,C')}$$

In some exemplary embodiments, the similarity-based weighting factor may be based on clustering of the cases. In a cluster-based weighting technique, the unlabeled cases may be grouped into clusters using any known-manner clustering algorithm known to those of ordinary skill in the art. The weighting factor computed for each case may be based on the characteristics of the cluster to which the case belongs. For example, weight factor may be computed based on the distance between the case and the centroid of the case's cluster, as well as additional characteristics of the case's cluster such as the cluster's diameter, radius, size, and the like. The cluster diameter may be computed as the maximum distance between cases in the cluster. The cluster radius may be computed as the maximum distance between the centroid and one of the cases in the cluster. The size of the cluster may be computed as the number of cases in the cluster or the total number of examples for all of the cases of the cluster.

After identifying the next case to provide to the trainer, the process flow of method 200 may return to block 206, wherein the identified case is presented to the trainer for labeling. At block 212, if the training system 116 determines that sufficient training data has been acquired, the process flow of method 200 may advance to block 216.

At block 216, the training system 116 may apply the classifier 114 to the remaining unlabeled data as well as any additional data that may be acquired later. New classification scores may be generated by the training system 116 for each of the unlabeled instances. The new classification scores may be used to flag the unlabeled instances according to whether they belong to the target class, as discussed above in relation to block 210. For example, those instances with classification scores greater than the threshold may be flagged as being of the target class, while those instances with classification scores below the threshold may be flagged as not belonging to the target class. In this way, a large volume of structured data lacking a common ontology may be processed to extract some specified target information. In some exemplary embodiments, the classifier 114 is retrained periodically or when it is determined that the classifier 114 is not performing adequately.

The target information extracted from the raw data may be used in wide variety of applications. In some exemplary embodiments, the search terms extracted from the query URLs are used to generate a wide variety of metrics pertaining to the desires and interests of Internet users based on the Web activity generated by a plurality of users across a plurality of Websites. Techniques for using the search terms extracted from the query URLs to generate such metrics are discussed further in the commonly assigned and co-pending U.S. patent application Ser. No. 12/618,151, filed on Nov. 13, 2009, entitled "Method and System for Processing Web Activity Data," by George Forman, et al., which is hereby incorporated by reference as though fully set forth in its entirety herein.

For purpose of clarity, certain exemplary embodiments have been described in terms of identifying user-entered search terms within query URLs generated by Web forms. However, it will be appreciated that the present techniques may be used in a number of exemplary embodiments to identify any suitable target class of information within any suitable collection of structured data. For example, exemplary embodiments of the present invention are directed to identifying columns in a database table that represent a particular semantic item, such as a comment, birth date, or product purchased. Other embodiments are directed to identifying columns in a PDF table that represent a particular semantic item, such as a part number or price. Further, a detail field, such as a price or product description may be identified within a business-specific or domain-specific semantic Web ontology or in XML data. Present techniques may also be used to identify text blocks in an HTML page that represent the page's content as opposed to advertising or boilerplate or to identifying the clauses in a contract document that specify fees or usage restrictions. Other exemplary embodiments are directed to identifying the portions of the scanned front matter of a book that represent the title, author, or copyright date or identifying the references in a scientific article. Still other embodiments are directed to identifying faces in a photograph that are a particular person, a woman, or just actually a face (of those determined to be potentially faces). Exemplary embodiments are also directed to other photo and video recognition techniques, such as identifying faces with red-eye distortion or portions of a picture that are out of focus, identifying construction activity or troop movement from satellite photographs, or identifying suspicious activity on security cameras. A general overview of a method that employs the techniques described herein is described in reference to FIG. 3.

Figure 3:
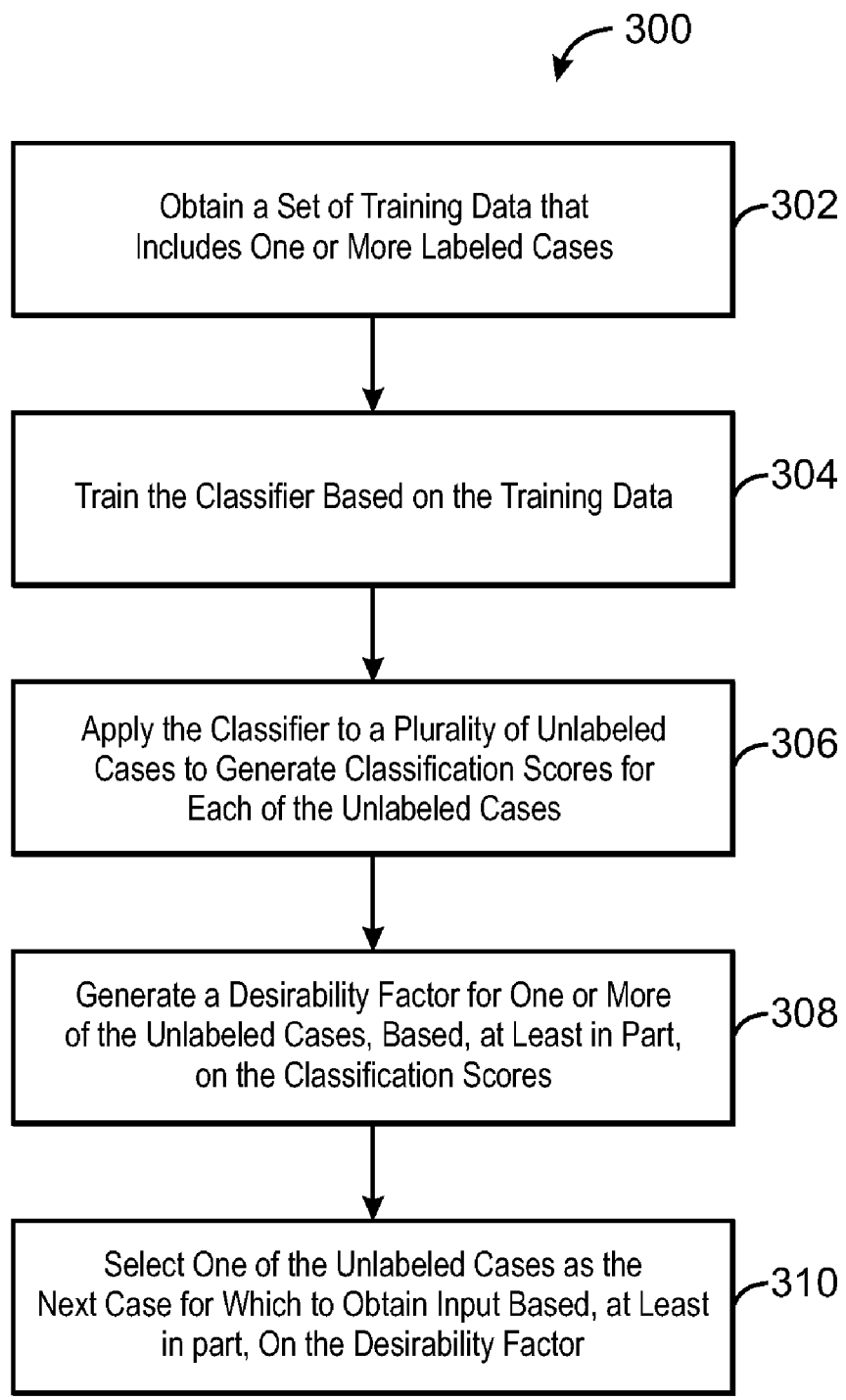
FIG. 3 is a process flow diagram of an overview of method for developing a classifier, in accordance with exemplary embodiments of the present invention.

FIG. 3 is a process flow diagram of an overview of a method for developing a classifier, in accordance with exemplary embodiments of the present invention. The method is generally referred to by the reference number 300 and begins at block 302, wherein a set of training data is obtained. The training data may include a plurality of cases. At block 304, the classifier may be trained based on the training data. At block 306, the classifier may be applied to a plurality of unlabeled cases to generate classification scores for each of the unlabeled cases. Each classification score may correspond with an instance of the unlabeled case. At block 308, a desirability factor may be generated for a plurality of the unlabeled cases, based, at least in part, on the classification scores. The desirability factor may correspond to a level of desirability of selecting the corresponding case as the next case for which to obtain training data. At block 310, one of the unlabeled cases may be selected as the next case for which to obtain input based, at least in part, on the desirability factor.

Figure 4:
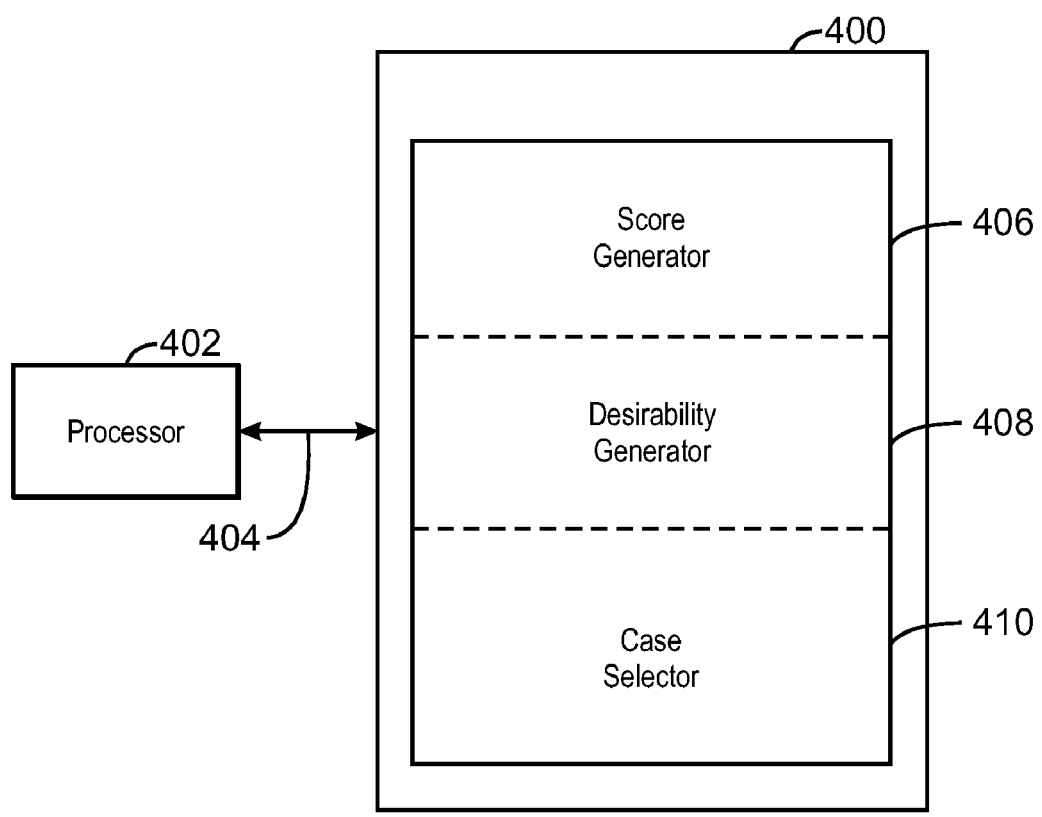
FIG. 4 is a block diagram showing a tangible, machine-readable medium that stores code configured to generate a classification tool, in accordance with exemplary embodiments of the present invention.

FIG. 4 is a block diagram showing a tangible, machine-readable medium that stores code configured to generate a classifier, in accordance with an exemplary embodiment of the present invention. The tangible, machine-readable medium is referred to by the reference number 400. The tangible, machine-readable medium 400 can comprise RAM, a hard disk drive, an array of hard disk drives, an optical drive, an array of optical drives, a non-volatile memory, a universal serial bus (USB) drive, a digital versatile disk (DVD), a compact disk (CD), and the like.

In some exemplary embodiments, the tangible, machine-readable medium 400 stores a collection of data comprising a query URLs generated by several users accessing Web forms from different Web sites. Further, the tangible, machine-readable medium 400 may be located in a client system 102 (FIG. 1), a server 104, or distributed across both the client system 102 and the server 104. In one exemplary embodiment of the present invention, the tangible, machine-readable medium 400 is accessed by a processor 402 over a communication path 404.

As shown in FIG. 4, the various exemplary components discussed herein can be stored on the tangible, machine-readable medium 400. For example, a first region 406 on the tangible, machine-readable medium 400 may store a score generator configured to apply the classifier to generate classification scores for each of the unlabeled cases. Each classification score may correspond with an instance of an unlabeled case. A region 408 can include a desirability generator configured to generate a desirability factor for one or more of the unlabeled cases, based, at least in part, on the classification scores. The desirability factor may correspond to a level of desirability of selecting the corresponding case as the next case for which to obtain training data. A region 410 can include a case selector configured to select a second case as the next case for which to obtain input based, at least in part, on the desirability factor. The tangible, machine-readable medium 400 may also store additional exemplary components. For example, the tangible, machine-readable medium 400 may also include an evaluator configured to characterize the quality of the classifier. The evaluator evaluate the quality of the classifier by recording a correct-positive tally, a correct-negative tally, a missed-positive tally, a missed-negative tally, and a wrong-positive tally, and generating case centric evaluation parameters based, in part, on one or more of the tallies.

What is claimed is:

1. A computer implemented method of generating a classifier, comprising:
    obtaining a set of training data comprising labeled cases;
    training a classifier based, at least in part, on the training data;
    applying the classifier to a plurality of unlabeled cases to generate classification scores for each of the unlabeled cases, wherein each classification score corresponds with an instance of a corresponding case; and
    wherein the classification score corresponding to a first instance in a case is computed based, at least in part, on a value of a case-centric feature corresponding to the first instance, wherein the value of the case-centric feature is based, at least in part, on characteristics of the first instance and a second instance in the case.

2. The computer implemented method of claim 1, comprising:
    generating a desirability factor for one or more of the unlabeled cases, based, at least in part, on the classification scores, the desirability factor corresponding to a level of desirability of selecting a corresponding case as a next case for which to obtain training data; and
    selecting one of the unlabeled cases as the next case for which to obtain input based, at least in part, on the desirability factor.

3. The computer implemented method of claim 1, wherein computing the value of the case-centric feature comprises normalizing a value of a second feature corresponding to the first instance with respect to values of the second feature corresponding to a plurality of instances in the case.

4. The computer implemented method of claim 1, wherein computing the value of the case-centric feature comprises ranking a plurality of instances in the case according to the values of a second feature corresponding to each of the plurality of instances.

5. The computer implemented method of claim 1, wherein the case-centric feature is based, at least in part, on a name associated with the first instance and a name associated with a second instance in the case.

6. The computer implemented method of claim 1, wherein generating the desirability factor comprises generating an uncertainty value for each instance in the case, the uncertainty value is based, at least in part, on the proximity of the classification score to a classification threshold, and the desirability factor is based, at least in part, on the uncertainty values.

7. The computer implemented method of claim 6, wherein generating the desirability factor comprises summing the uncertainty values.

8. The computer implemented method of claim 6, wherein generating the desirability factor comprises ranking the instances in the case.

9. The computer implemented method of claim 1, wherein the desirability factor is modified by a weighting factor that is based, at least in part, on a similarity between cases.

10. The computer implemented method of claim 9, wherein the weighting factor is based, at least in part, on a distance between the instances of a first case and the instances of a second case.

11. The computer implemented method of claim 1, comprising generating one or more case-centric evaluation parameters that characterize the quality of the classifier.

12. The computer implemented method of claim 11, wherein generating one or more case-centric evaluation parameters comprises recording a correct positive tally, a correct negative tally, a missed positive tally, a missed negative tally, and a wrong positive tally, and the case centric evaluation parameters are based, at least in part, on one or more of the tallies.

13. A computer system, comprising:
    a processor that is configured to execute machine-readable instructions;
    a memory device that is configured to store a classifier, a set of training data comprising labeled cases, and instructions that are executable by the processor, the instructions comprising:
    a score generator configured to apply the classifier to generate classification scores for each of the unlabeled cases; each classification score corresponding with an instance of the unlabeled case;
    a desirability generator configured to generate a desirability factor for one or more of the unlabeled cases, based, at least in part, on the classification scores, the desirability factor corresponding to a level of desirability of selecting the corresponding case as the next case for which to obtain training data; and
    a case selector configured to select one of the unlabeled cases as the next case for which to obtain input based, at least in part, on the desirability factor.

14. The computer system of claim 13, comprising an evaluator configured to characterize a quality of the classifier by recording a correct-positive tally, a correct-negative tally, a missed-positive tally, a missed-negative tally, and a wrong-positive tally, and generating case centric evaluation parameters based, at least in part, on one or more of the tallies.

15. The computer system of claim 13, wherein the classification score corresponding to a first instance in a case is computed based, at least in part, on a value of a case-centric feature corresponding to the first instance, wherein the value of the case-centric feature is based, at least in part, on characteristics of the first instance and a second instance in the case.

16. The computer system of claim 13, wherein the desirability generator is configured to compute the desirability factor by generating an uncertainty value for each instance in the case and summing the uncertainty values.

17. The computer system of claim 16, wherein the desirability generator is configured to modify the desirability factor of a first case by a weighting factor that is computed based, at least in part, on a Euclidean distance between the instances of the first case and the instances of a second case.

18. A tangible, non-transitory, computer-readable medium, comprising code configured to direct a processor to:
    generate a classification score for an instance of an unlabeled case;
    generate a desirability factor for the unlabeled case, based, at least in part, on the classification score, the desirability factor corresponding to a level of desirability of selecting the unlabeled case as the next case for which to obtain training data; and
    select the unlabeled case as the next case for which to obtain input based, at least in part, on the desirability factor.

19. The tangible, non-transitory, computer-readable medium of claim 18, comprising code configured to direct the processor to generate a case-centric instance feature, wherein the classifications scores are generated based, at least in part, on the case-centric instance feature.

20. The tangible, non-transitory, computer-readable medium of claim 18, comprising code configured to direct the processor to generate an uncertainty value for the instance based, at least in part, on the proximity of the classification score to the classification threshold, and the desirability factor is based, at least in part, on the uncertainty values.

* * * * *